Oct. 31, 1950   R. L. SINSHEIMER   2,527,769
RADIO OBJECT LOCATION SYSTEM
Filed Jan. 24, 1945
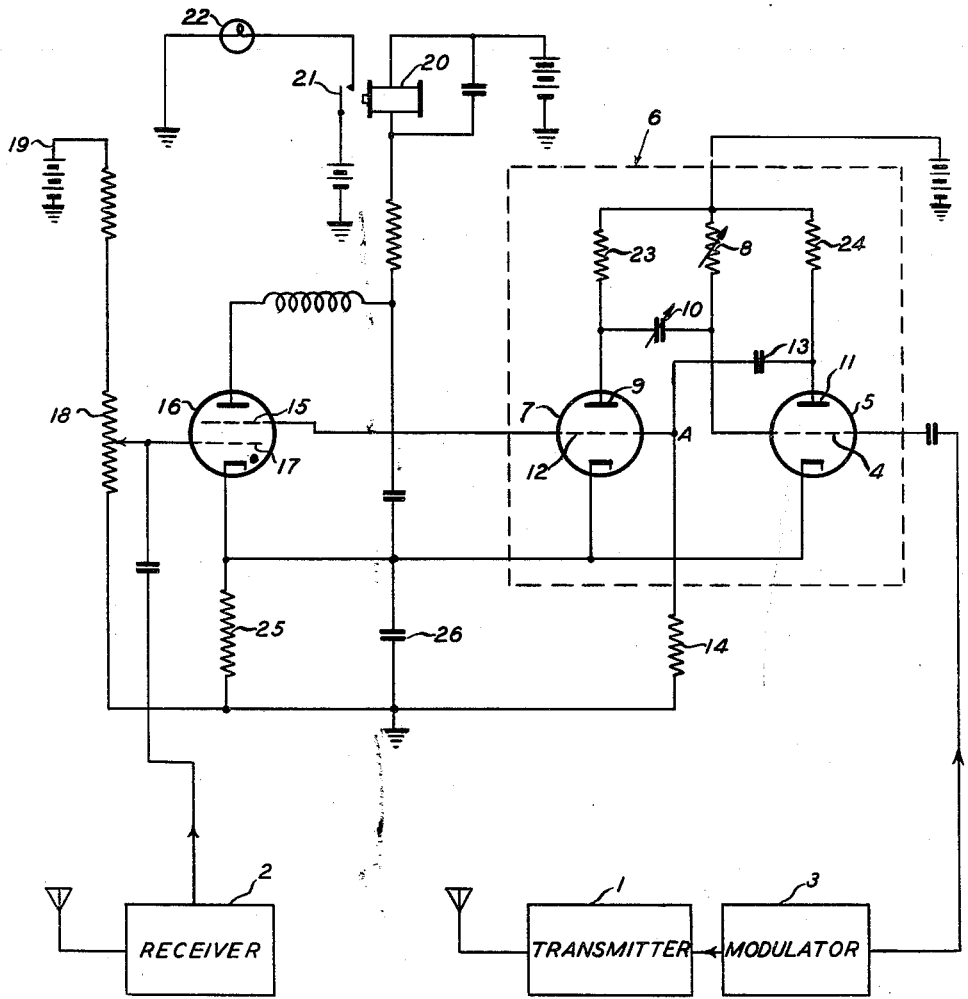
INVENTOR.
ROBERT L. SINSHEIMER
BY
William D. Hall
Attorney Patented Oct. 31, 1950

2,527,769

UNITED STATES PATENT OFFICE 2,527,769

RADIO OBJECT LOCATION SYSTEM

Robert L. Sinsheimer, Cambridge, Mass., assignor, by mesne assignments, to the United States of America as represented by the Secretary of War Application January 24, 1945, Serial No. 574,376

1 Claim. (Cl. 343—13)

This invention relates to communication circuits and particularly to electronic control circuits.

In certain applications of radio object-locating systems, there is a need for an indication if an object is within a predetermined space or area. In these applications it is not necessary to determine the exact position of the object. If an object is within the boundaries of the space or area a warning device of some nature is operated, but if there is no object within said boundaries there is no indication. The side boundaries of the area may be determined by the directional characteristics of a radiating antenna. However, in order to completely inclose an area, there must also be a range or distance boundary.

It is, therefore, an object of this invention to provide a circuit for establishing a range boundary in the above mentioned system.

Other objects are: to provide a circuit which will operate only under predetermined conditions, and to provide a gating circuit for the operation of an indicating device or the like only within a predetermined period of time.

Other objects will be apparent after a study of the following specification and claim and the accompanying drawing which constitutes a circuit diagram of one embodiment of the invention.

Referring to the drawing, there is shown a radio transmitter 1 of the pulse modulated type commonly used in radio object-locating systems. Receiver 2 is provided for the reception of any pulse transmissions reflected by a distant object. To provide the pulses for transmitter 1 there is shown a modulator unit 3. Transmitter 1, receiver 2 and modulator 3 are shown in block diagram form since, as individual units, they are well known in the art, and many possible circuits may be used.

Modulator 3 is also connected to a grid 4 of an electron tube 5. Tube 5 is one of a pair of tubes in a multivibrator unit generally indicated by the figure 6. The multivibrator will be recognized as being of the positive grid return type in which the tube 5 is normally conducting.

Grid 4 is also connected through a dropping resistor 8 to a source of positive voltage and through a capacitor 10 to the anode 9 of tube 7, the second of the pair of tubes included in the multivibrator 6. Anode 11 of tube 5 is connected to grid 12 of tube 7 through a capacitor 13. Grid 12 is grounded through a resistor 14, and is also directly connected to the screen grid 15 of a gas-filled tetrode 16. Anodes 9 and 11 of tubes 7 and 5 are respectively connected through resistors 23 and 24 to a positive voltage source. The cathodes of tubes 5, 7 and 16 are connected through a common resistor 25 to ground, this resistor being shunted by a capacitor 26.

Control grid 17 of tube 16 is connected to the output terminal of receiver 2. To provide proper bias, grid 17 is connected to the contact of a potentiometer 18 which is between a source 19 of positive potential and ground. The output of tube 16 is applied to a relay 20 having contacts 21 which, when the relay is energized, complete the circuit for an indicating device such as a lamp 22.

The operation of the device is as follows:

Pulses are generated in modulator unit 3, triggering transmitter 1 for the transmission of intermittent short pulses of radiant energy. A negative pulse corresponding to each pulse generated by modulator unit 3 is fed to the grid 4 of tube 5. Since tube 5 is normally conducting, the negative pulse applied to grid 4 causes tube 5 to cease conducting, thereby causing the potential of the plate 11, and correspondingly the potential of the grid 12 of tube 7 and the point indicated at A, to rise sharply. This sharp rise in potential also appears on the grid 15 of the gas tube 16. Tube 7 then starts to conduct due to the positive change of potential on grid 12 and plate 9 drops in potential, causing a further drop in the potential of grid 4 and a corresponding rise in the potential of plate 11. This cumulative action takes place practically instantaneously and continues until the grid potential of tube 7 rises to the cathode level, whereupon the grid 12 draws current and further rise in potential of point A is prevented. The charge potential of condenser 10 thereupon changes to adjust itself to the changed voltage distribution, causing the grid potential of tube 5 to rise to its normal operating positive value. The time taken by grid 4 to return to its normal operating positive potential is largely determined by the values of resistor 8 and capacitor 10, which may be variable in order to afford range adjustment. When the potential of grid 4 exceeds its cut-off value, the tube 5 will again conduct, and tube 7 will cease to conduct. At this time the circuit returns to its quiescent condition and point A drops to its normal ground potential.

The result is that a short pulse of positive potential of predetermined duration is applied to screen grid 15, thus conditioning the gas-filled tube 16 for conduction. Whether or not the tube 16 actually conducts depends upon the potential simultaneously appearing at grid 17. In other words, a sufficient positive potential must appear simultaneously on grids 15 and 17 to cause tube 16 to conduct.

If the positive pulse from multivibrator 6 concurs with a reflected object-echo pulse which is received by the receiver 2 and applied to the grid 17 of tube 16, then the tube 16 will conduct. The operation of tube 16 causes the relay 20 to close its contacts 21, resulting in the lighting of lamp 22.

Since the speed of radio frequency energy through space is a known constant, the length of the positive pulse on grid 15 may be calibrated in terms of distance from transmitter 1 to a distant object. If the distant object is beyond a predetermined distance the reflected pulse picked up by receiver 2 and applied to grid 17 will come at a time after the positive pulse applied to grid 15 has ended. In this case tube 16 will not conduct and no indication will appear on lamp 22.

As there will be noise signals as well as object-echo signals, the gas tube 16 must be prevented from firing for signals other than the desired object signals. With screen grid 15 connected as shown, and the variable control bias for grid 17 adjusted properly, the circuit can be made to operate only for the desired object signals.

Thus it is seen that the described circuit provides a means of warning when an object is within a predetermined distance from the radio system but no warning when the object is beyond this predetermined distance.

While there has been described a preferred embodiment of the invention, it will be apparent to those skilled in the art that many modifications are possible without departing from the scope of the invention.

What is claimed is:

In a radio object location system including a transmitter for transmitting pulses, a receiver for receiving said pulses after reflection from a target, and a pulse modulator connected to said transmitter, a warning circuit for indicating a target within a given range comprising a delay multivibrator of the type providing a single, positive-going, square wave pulse of adjustable duration in response to a single input trigger pulse; means connecting the output of said modulator to the input of said multivibrator; a gas-filled tetrode, means for normally biasing said tetrode below cut-off; a source of direct potential connected to the anode of said tetrode; a storage capacitor connected between the anode and cathode of said tetrode, said capacitor being normally charged to the potential of said source; means connecting the output of said receiver to one grid of said tetrode; means connecting said square wave pulse output of said multivibrator to the other grid of said tetrode; indicating means in circuit with said tetrode and energized by current flow therethrough; and means for adjusting the bias of said tetrode so that the coincidence of a received pulse and a square wave pulse causes said tetrode to conduct, said indicator to be energized, and said capacitor to discharge through said tetrode until the cathode to anode potential thereof falls below the extinction potential of said tetrode thereby causing said tetrode to cease conducting, whereby a target within a range determined by the duration of said square wave pulse causes said indicator to be energized.

ROBERT L. SINSHEIMER.

REFERENCES CITED

The following references are of record in the file of this patent:

UNITED STATES PATENTS

| Number | Name | Date |
| --- | --- | --- |
| 1,729,595 | Hayes | Sept. 24, 1929 |
| 1,924,174 | Wolf | Aug. 29, 1933 |
| 2,301,254 | Carnahan | Nov. 10, 1942 |
| 2,373,145 | Sensiper et al. | Apr. 10, 1945 |
| 2,403,527 | Hershberger | July 9, 1946 |
| 2,406,316 | Blumlein | Aug. 27, 1946 |
| 2,410,424 | Brown | Nov. 5, 1946 |
| 2,421,018 | De Rosa | May 27, 1947 |